Figure 1:
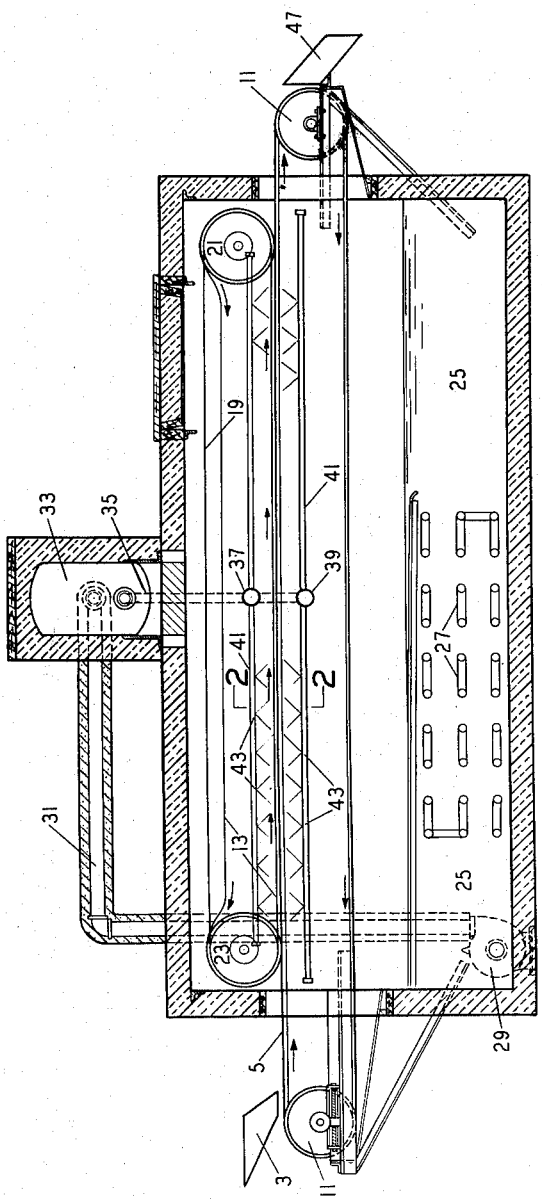

July 20, 1943.  D. W. KING  2,324,517
APPARATUS FOR FREEZING FOODSTUFFS
Filed April 1, 1942  2 Sheets-Sheet 1

David W. King
INVENTOR
BY Arthur P. Davis
ATTORNEY

July 20, 1943.   D. W. KING   2,324,517
APPARATUS FOR FREEZING FOODSTUFFS
Filed April 1, 1942   2 Sheets-Sheet 2

David W. King
INVENTOR
BY Arthur L. Davis
ATTORNEY

Patented July 20, 1943

2,324,517

UNITED STATES PATENT OFFICE 2,324,517

APPARATUS FOR FREEZING FOODSTUFFS

David W. King, Knoxville, Tenn.

Application April 1, 1942, Serial No. 437,285

1 Claim. (Cl. 62—104)

(Granted under the act of March 3, 1883, as amended April 30, 1928; 370 O. G. 757)

The invention herein described may be manufactured and used by or for the Government for governmental purposes without the payment to me of any royalty thereon.

This invention relates to the art of freezing foodstuff, particularly the individual quick freezing of such foodstuff.

Units of foodstuff have been individually frozen by bringing them in direct contact with a refrigerant fluid, but it is often desirable or necessary to remove refrigerant fluid which remains adhered to the frozen foodstuff before the same is packaged for distribution. One process has been proposed which indicates that this particular difficulty might be substantially overcome, wherein the units of a comestible are enclosed with a highly flexible material having the characteristic of being able to conform at low temperatures substantially to the shape of the comestible confronting the material, the comestible being frozen by means of refrigerant passing in contact with such flexible material.

The principal object of this invention is to provide an apparatus wherein units of a comestible may be individually frozen by continuous movement through a zone cooled by refrigerant liquid without retaining any appreciable portion of such liquid on the surface thereof. Another object of this invention is to provide an apparatus for the quick freezing of comestibles wherein such comestibles are frozen by thermal transfer through a semipermeable membrane, thereby preventing the retention of any appreciable amount of refrigerant on the surface thereof. A further object of this invention is to provide an apparatus for freezing foodstuff which will transfer heat readily in a zone immediately adjacent to the product being frozen due to the capability of certain elements thereof to readily conform to the shape of units of the material being frozen. A still further object of this invention is to provide an apparatus for the quick freezing of comestibles which is readily adjustable to accommodate the character and size of various comestibles which may be frozen therein. Still another object of this invention is to provide an apparatus for the quick freezing of foodstuff wherein the refrigerant liquid is not appreciably contaminated by constituents or components of the foodstuff being frozen. Other objects of this invention include the provision of an apparatus for freezing foodstuff which is economical to construct, which may be built in relatively small units, and which has a relatively high capacity.

The present invention is directed to an apparatus for freezing units of a comestible which includes the combination of a chamber providing a refrigeration zone; a mobile member traversing said chamber, said member comprising a laterally supported sheet of highly flexible material having the characteristic of being able to conform at low temperatures substantially to the shape of units of comestible contacting the same; a second like mobile member moving contiguous to and above said first mentioned mobile member; means for directing refrigerant liquid against the bottom and top, respectively, of the flexible material of said first and second mobile members; means for disposing units of comestible on said first mentioned mobile member; and means for moving said mobile members and the units of comestible between them through said chamber whereby said units are frozen by thermal transfer through said flexible material.

Figure 2:
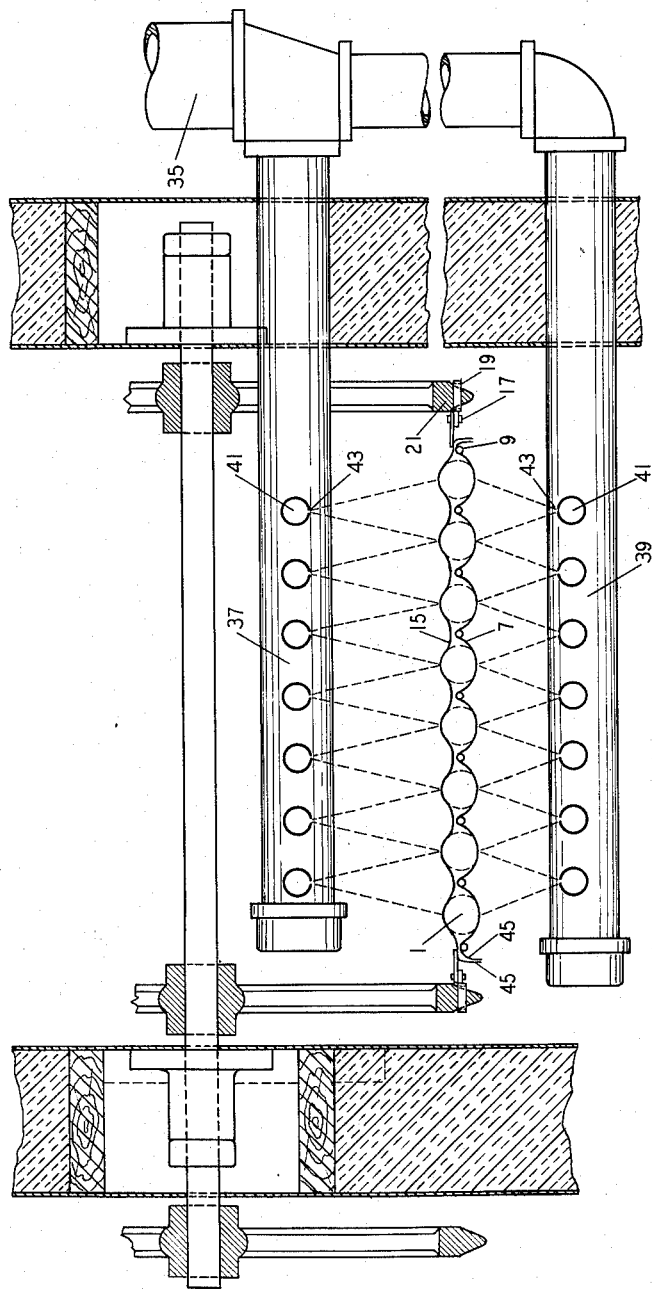

In the accompanying drawings which form a part of the specification, wherein reference symbols refer to like parts whenever they occur, Fig. 1 is a sectional, longitudinal, elevational view of one form of apparatus for the embodiment of the present invention; and Fig. 2 is an enlarged, transverse, elevational view of section 2—2 of the apparatus shown in Fig. 1.

In the drawings, units of the comestible 1 to be frozen are delivered from feed table 3 to moving mobile member 5 which is composed of a laterally supported sheet 7 of highly flexible material having the characteristic of being able to conform at low temperatures substantially to the shape of units of a comestible contacting the same, the supports therefor consisting of flexible metal cables 9 over driven sheaves 11. The cables 9 are so spaced that the sheet 7 is formed into a predetermined configuration when the units of comestible come in contact therewith. As the units of the comestible proceed along the mobile member 5 they are confronted with a second mobile member 13 composed of a like sheet of highly flexible material 15, which is laterally supported, such lateral supports consisting of attachments 17 connected to an endless chain 19 which passes over driven sprocket 21 and idle sprocket 23. The refrigerant liquid in reservoir 25 is maintained at the proper temperature by refrigerating coils 27 of a refrigeration apparatus (not shown). The refrigerant liquid so cooled is delivered by pump 29 through conduit 31 to an equalizing pressure reservoir 33 and delivered through conduit 35, to headers 37 and 39 located respectively above mobile member 13 and below mobile member 5. Each header is provided with conduits 41, each of which are equipped with spray nozzles 43, which direct the refrigerant liquid downwardly and upwardly respectively on the sheets 15 and 7 of the highly flexible material. The edges of each supported sheet of highly flexible material 7 and 15 are provided with aprons 45, which by falling in close juxtaposition as the mobile members of which they are a part pass through the spray of refrigerant liquid form a seal which prevents the refrigerant liquid from coming in direct contact with the units of the comestible as they pass through the refrigeration zone. The units of the comestible are passed along by the mobile members 5 and 13 at such a rate that they are frozen to the desired degree and are thereafter discharged from mobile member 5 into discharge chute 47.

The essential feature of the present invention is to provide an apparatus wherein units of a comestible are moved continuously between two sheets of highly flexible material having the characteristic of being able to conform at low temperatures substantially to the shape of the units of the comestible confronting the same. Such material may either be impervious to refrigerant liquid or slightly liquid permeable. The flexible sheets of material so contacting the units of the comestible conform thereto, regardless of variation in sizes of the units of any one comestible. The sheets of flexible material may be impervious to the liquid refrigerant, particularly where such refrigerant is not particularly suitable for direct contact with the comestible, but it is preferable that the flexible material be semi liquid permeable; that is, it will have the characteristic of being able to be wet by the refrigerant, and thereby afford a more rapid thermal transfer between the units of the comestible and the refrigerant liquid. An unfilled canvas is a typical example of a flexible material which is only semi liquid permeable and which has been found to be satisfactory for the purpose.

The bottom sheet of highly flexible material which supports the weight of units of the comestible passing through the refrigeration zone is supported laterally by continuous cables or chains suspended between sheaves or sprockets. Intermediate longitudinal supports may be provided to form a predetermined configuration of units of the comestible being frozen. This may be accomplished by supporting the sheet of highly flexible material at intermediate points with cables suspended between sheaves corresponding to the lateral supports, or may consist of transverse supports between lateral cables.

The upper sheet of highly flexible material covering the units of the comestible being frozen is laterally supported by cables or chains suspended between sheaves or sprockets, while the intermediate portions thereof are supported by the upper surfaces of the units of the comestible in contact therewith.

The mobile members comprising the lower highly flexible sheet and the upper highly flexible sheet and the corresponding lateral supports and sheaves or sprockets attached thereto may be moved through the refrigeration zone, by rotating the upper forward sheave or sprocket, the lower forward sheave or sprocket, or both sheaves or sprockets. Ordinarily, the speed of the sheaves or sprockets is so regulated that the highly flexible sheets of the contiguous mobile members move at the same speed through the refrigeration zone. However, under some circumstances, it may be desirable to have a predetermined differential between the speed of the two mobile members so adjusted to provide a slight rotation of the units of the comestible passing through the refrigeration zone, thereby presenting a changing relationship between the surface of the units of the comestible and the surface of the highly flexible sheets of the respective mobile members.

The refrigerant liquid used for the freezing of the units of the comestible is directed upwardly against the bottom of the highly flexible material of the lower mobile member upon which the units of the comestible being frozen are supported, and it is likewise directed downwardly upon the surface of the upper layer of the highly flexible material of the upper mobile member which covers the units of the comestible being frozen. The refrigerant liquid passes from the highly flexible sheet and is returned to the refrigeration system for further cooling and recycling. The edges of the upper sheet, and preferably the edges of both sheets of the highly flexible material of each mobile member are provided with flexible aprons which, by falling in close juxtaposition as they pass through said zone, seal the units of the comestible passing through said zone against the admission of refrigerant liquid, either in the form of a spray as it is applied to the surfaces of the highly flexible material, or as a liquid stream as it flows from the surface of the upper sheet of such material.

It will be seen, therefore, that this invention actually may be carried out by the use of various modifications and changes without departing from its spirit and scope.

I claim:

An apparatus for freezing units of a comestible which comprises the combination of a chamber providing a refrigeration zone; a mobile member traversing said chamber, said member comprising a laterally supported sheet of highly flexible material having the characteristic of being able to conform at low temperatures substantially to the shape of units of comestible contacting the same; a second like mobile member moving contiguous to and above said first mentioned mobile member; means for directing refrigerant liquid against the bottom and top, respectively, of the flexible material of said first and second mobile members; means for disposing units of comestible on said first mentioned mobile member; and means for progressing said mobile members moving at different rates and the units of comestible between them through said chamber, thereby causing a change of surface contact of units of comestible disposed between the flexible material of said mobile members with the freezing of the comestible units by thermal transfer through said flexible material.

DAVID W. KING.